Figure 1:
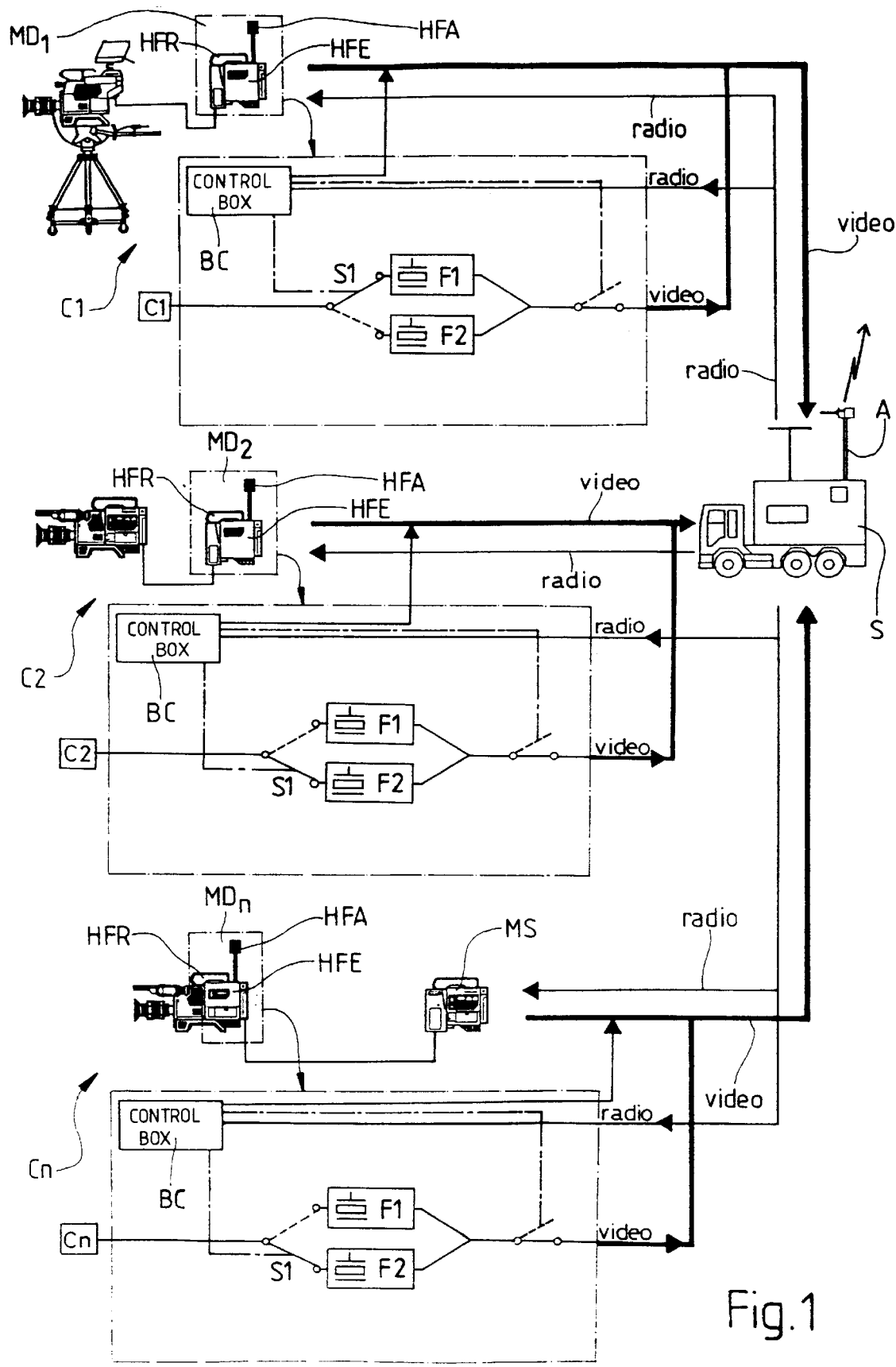

United States Patent [19]
Zwahlen et al.

[11] Patent Number: 5,854,654
[45] Date of Patent: Dec. 29, 1998

[54] SYSTEM AND METHOD FOR HIGH FREQUENCY TRANSMISSION OF TELEVISION SHOTS

[76] Inventors: Laurent Zwahlen; Milva Zwahlen, both of Rue des Epancheurs 10, CH-2012 Auvernier; Rudolf Schaffer, Cernil-Antoine 9, CH-2306 La Chaux-de-Fonds, all of Switzerland

[21] Appl. No.: 722,225

[22] PCT Filed: Apr. 25, 1995

[86] PCT No.: PCT/EP95/01555

§ 371 Date: Oct. 23, 1996

§ 102(e) Date: Oct. 23, 1996

[87] PCT Pub. No.: WO95/29556

PCT Pub. Date: Nov. 2, 1995

[30] Foreign Application Priority Data

Apr. 25, 1994 [FR] France .................................. 94 04953

[51] Int. Cl.$^6$ .................................................. H04N 7/18
[52] U.S. Cl. ........................... 348/159; 348/221; 348/722
[58] Field of Search .................... 348/159, 153, 348/469, 488, 388, 211, 705, 722

[56] References Cited

U.S. PATENT DOCUMENTS

| | | | |
|---|---|---|---|
| 3,917,906 | 11/1975 | Johnson | 348/388 |
| 4,977,449 | 12/1990 | Morgan | 348/159 |
| 5,305,100 | 4/1994 | Choi | 348/159 |
| 5,335,014 | 8/1994 | Elberbaum | 348/211 |
| 5,583,796 | 12/1996 | Reese | 348/159 |

Primary Examiner—Victor R. Kostak
Attorney, Agent, or Firm—Griffin, Butler, Whisenhunt & Szipl

[57] ABSTRACT

The invention concerns a high frequency image transmission system comprising several shooting units (Ci) comprising a camera, a receiver (HFR) and a transmitter (HFE) able to transmit a video signal to a central production unit (S), and two video channels respectively allowing transmission on a first and a second predetermined carrier frequency (Fi, Fj). This system is characterized in that said central production unit comprises a control unit (UC) for transmitting a control radio signal to said shooting units to control remotely their operation and for controlling the assignment of said channels so that one of said channels transmits, on one of said carrier frequencies (F1, F2), a first video signal coming from a selected shooting unit, while the other said channel transmits, on the other said frequency, a second video signal formed by temporal multiplexing of the signals coming from the other shooting units.

13 Claims, 7 Drawing Sheets

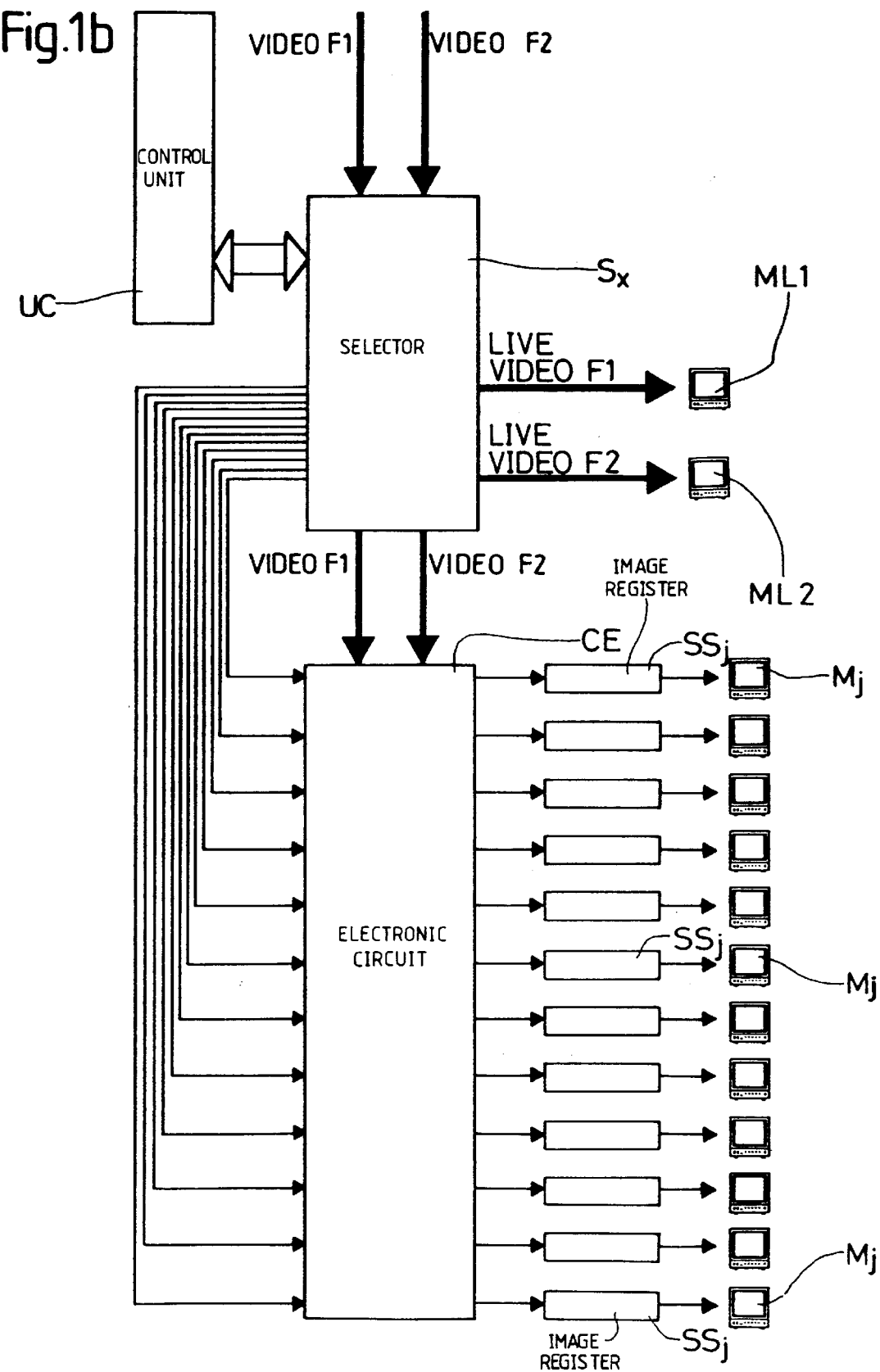

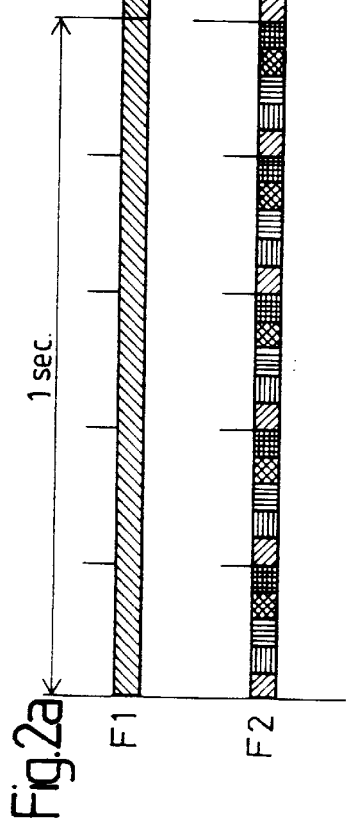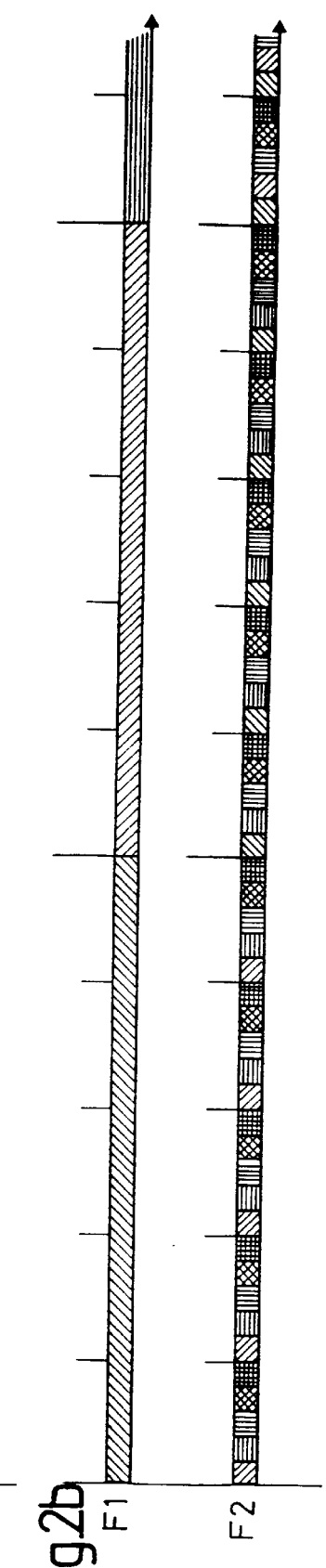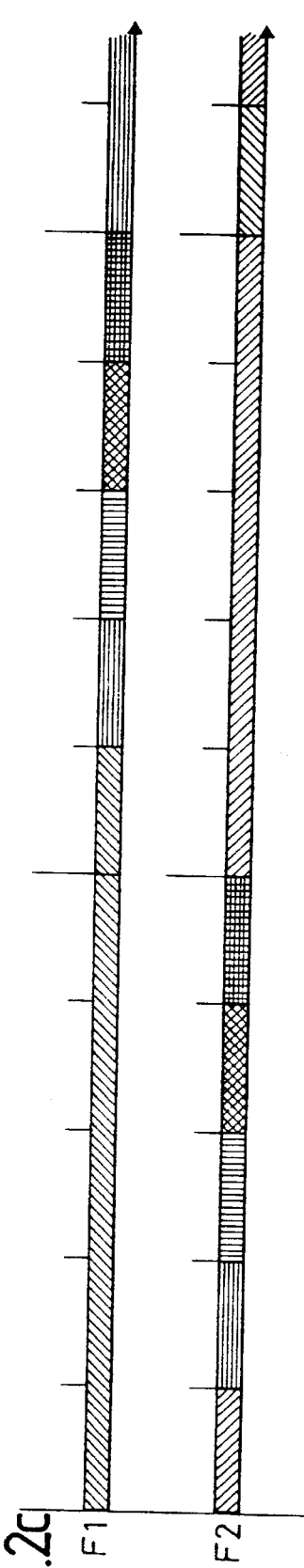

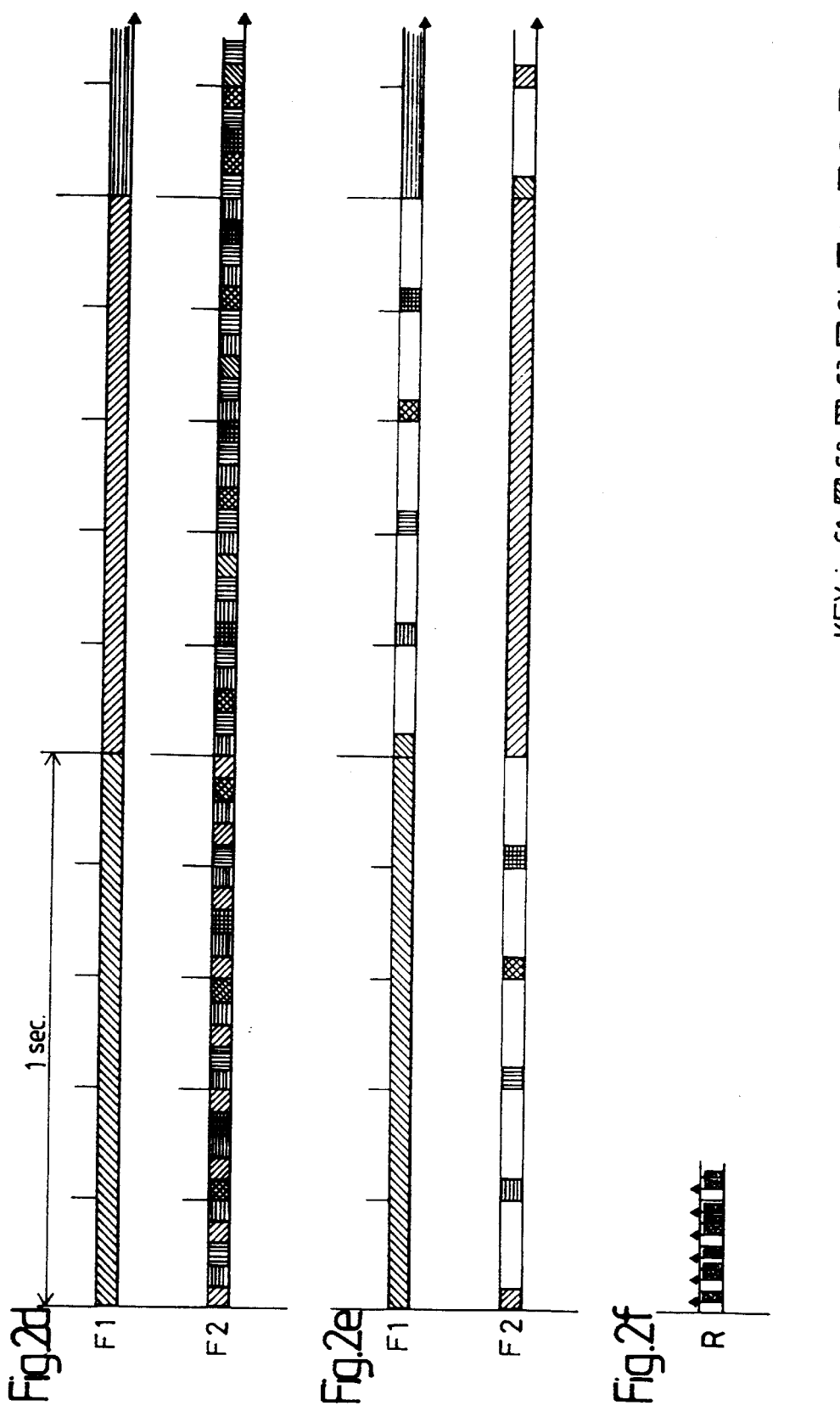

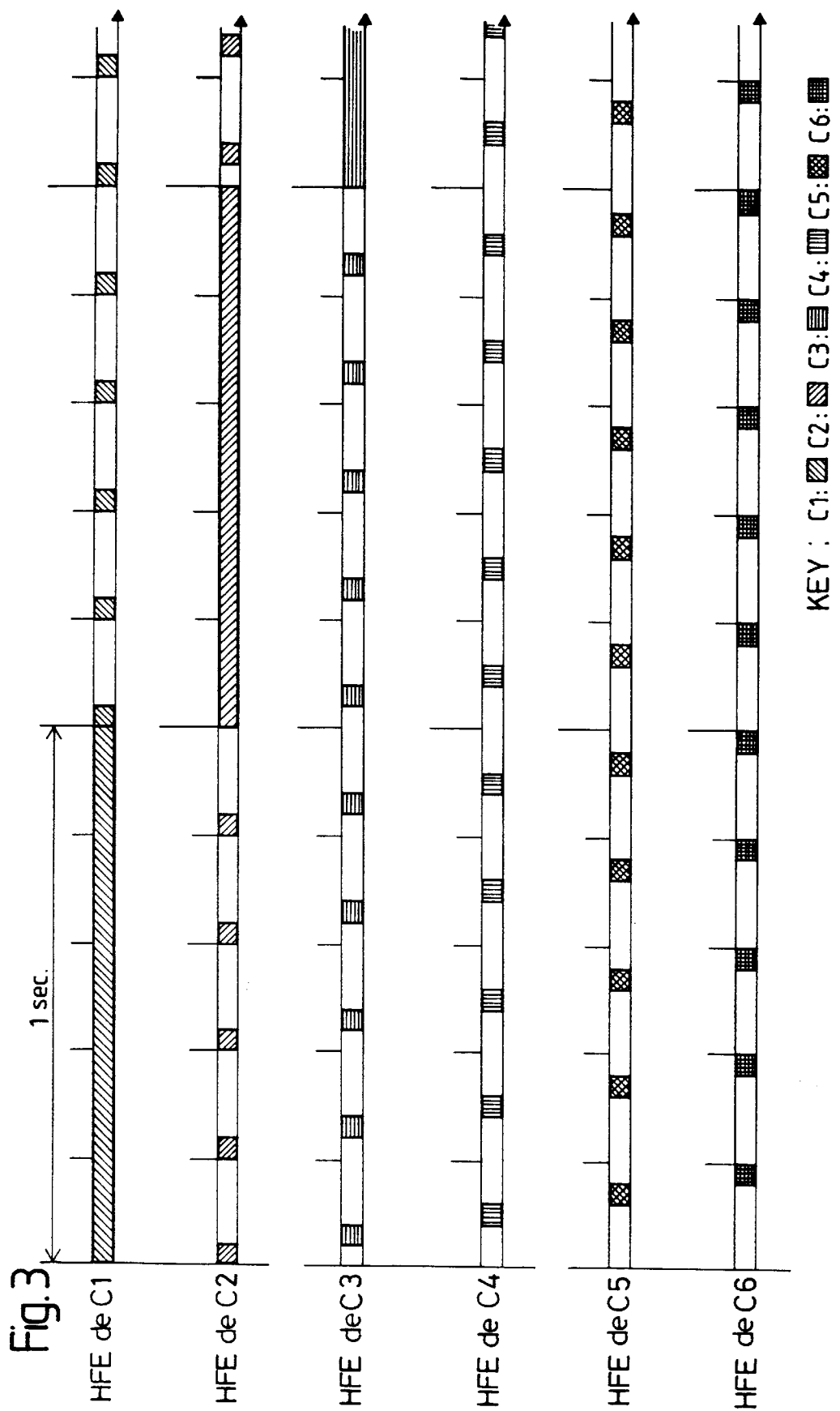

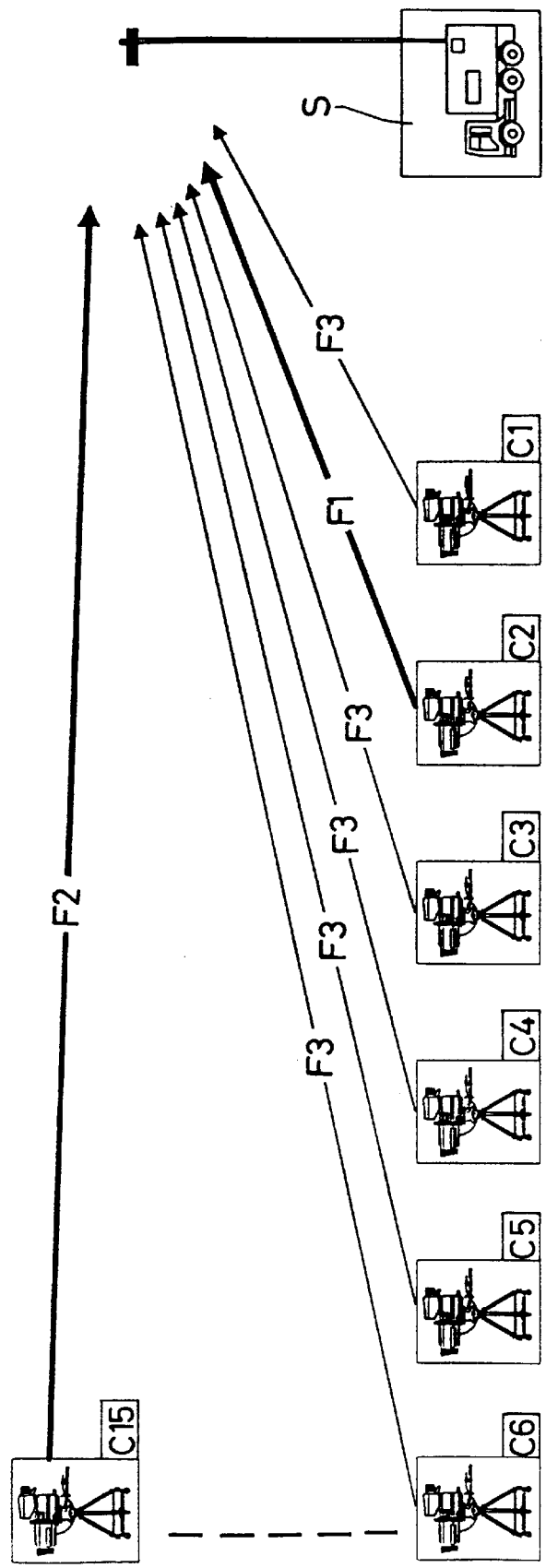

SYSTEM AND METHOD FOR HIGH FREQUENCY TRANSMISSION OF TELEVISION SHOTS

The present invention concerns a system for high frequency transmission of television shots and more particularly a high frequency (HF) wireless television image transmission system of a quality at least equal to that prescribed by prevailing standards in television networks and allowing several mobile cameras to be connected to one production station, such as a mobile production unit, in order to allow a television program to be made with a view to the live broadcasting and/or recording thereof. Moreover, the system may be completely mobile. Such a system is disclosed for example in American patent U.S. Pat. No. 4,091,422.

There is known from the article "Portable television shot equipment" by J. Cayzac, ACTA Electronica, vol. 11, no. 4, October 1968, pages 352–360 a wireless image transmission system comprising, on the one hand, several shooting units each including a camera and a module comprising a radio wave receiver and a high frequency transmitter able to transmit via radio waves a shot signal provided by said camera to a central production unit capable of communicating with a broadcasting network to broadcast live and/or to record at least one of said signals and, on the other hand, at least two hertzian video channels each allowing the transmission on a predetermined carrier frequency of a video signal representing a predetermined number of images per second, said channels connecting said shooting units to the central production unit.

In such systems known from the prior art, an operator controls the operation of a camera. The shot is transmitted via a hertzian video channel on a transmission frequency made available by the granting authority to a reception point, for example a mobile production unit where the producer of the television program to be broadcast live and/or recorded is situated. In his mobile unit, the producer receives several video signals corresponding to the shots from the various cameras on monitors. He may choose at any moment the video signal or signals to be broadcast live and/or recorded. Since his choice is based on the different images displayed on the monitors, it is desirable for the producer to have the greatest possible number of images available, and preferably those from all the cameras used, so as to have a global vision of events and so as to always be able to choose, from among the video signals corresponding to said shots from the various cameras, the most interesting video signal or signals to be broadcast live and/or recorded. Each camera then needs its own hertzian video channel which, in the event that the live broadcasting or recording quality has to conform with television network standards, must have a passband of 6 to 8 MHz.

It is known that the high frequency bands able to be used for this type of transmission are already very heavily loaded so that the granting authority can only reserve very few frequencies for each transmission system.

In the event that the desired number of cameras is higher than the allotted number of frequencies, it is obvious that numerous additional operations are necessary. Moreover, since each camera does not therefore have its own hertzian video channel available for transmitting its shots, this method of working of course does not allow simultaneous use and display of all the shots from the various cameras in the mobile production unit where the producer is situated. The producer thus loses any global vision of events, which constitutes an enormous handicap for him. These additional operations may thus lead to overworking, loss of data, etc . . .

There is also known from American patent U.S. Pat. No. 4,943,854 a video surveillance system which allows multiplexing of the various images provided by the shooting units. However, here the quality of the images is not very important, since it is sufficient to recognise the places monitored, and the image change speed is generally relatively low in comparison with a live broadcast. Furthermore, this patent makes no mention of the possibility of transmitting the images via radio waves. Thus, the requirements of such a system are completely different from those of the present invention which aims towards very high quality with minimum use of the available frequency spectrum.

Thus, the H.F. camera transmitters, which cannot be displayed, in fact pollute the frequency spectrum, because they generally continue to operate so that the passing from one camera to another can be carried out rapidly. There are in fact only a few frequencies available so as to avoid pollution of the spectrum. It is thus essential to avoid such interfering transmitters. The systems of the prior art often simply use control of idle period which determines a cut out time for the camera. During all such idle period, which may last for example several seconds or minutes, there is pollution of the spectrum. Since the frequency used is not made available, efficient use of the occupied frequency is not possible during all this idle period with such a system. Moreover, if for example the camera leaves the control signal reception field or enters a tunnel and can no longer pick up such control signal, its H.F. transmitter continues to transmit during this idle period thereby polluting the frequency spectrum.

These disadvantages evidently limit the use of these H.F. transmission systems of the prior art, while the evolution of television network working methods and the ever increasing demands of television audiences for television programs broadcast live and/or shortly after recording (sport, demonstrations, etc.) would in fact encourage the use of such H.F. systems.

The making of a television program covering a downhill ski race or a golf competition necessitates the installation of a large number of cameras all the way along the course, which is not always easy to achieve and often requires a great deal of time. Indeed, for each camera, it is normally necessary to install a cable between the camera and the mobile production unit or station.

Although using a multiplexing cable transmission system for shot images is known, such as the system disclosed in document EP-B-0 188 286, such a system always necessitates the installation of a cable between its means for transmitting the image signals coming from the cameras and the receiving station for such signals. Because of the great lengths of the cables to be installed, the installation and disassembly times are consequently long and generally also necessitate the immobilisation of several production components for the same length of time, while the program made lasts only la few hours. Moreover, image quality is an essential factor in the field of transmission of images of broadcasting quality, as opposed to the field of surveillance to which the subject of aforecited document EP-B-0 188 286 applies. It is thus understood that the necessary signal compression methods described in such document are not always accepted by technicians in the field of transmission for broadcasting.

Furthermore, the production of a cycling race necessitates the installation of several mobile cameras fitted with an H.F. image transmission system and distributed on motorbikes and in helicopters. Obviously, the use of one or more cables is not possible here.

On account of the disadvantages of H.F. systems such as those described hereinabove, the transmission of images from the various cameras necessitates numerous operators and complementary switching material so as to use only the limited number of allotted frequencies, which substantially increases the "technical production costs".

An aim of the present invention is to provide a solution to these disadvantages by proposing a system which allows the wireless transmission of shots from a large number of fixed and/or mobile cameras with broadcasting image quality to a central production unit using only a very limited Amber of hertzian video channels, and therefore frequencies, but thereby ensuring global use and display of all the camera shots in the central production unit. Such transmission may be made either live or via one or more relays, for example if required by the topography of the region in which the system is situated. Moreover, it is necessary to avoid unnecessary occupancy of the frequency spectrum by transmitters which are not in use.

Another aim of the present invention is to provide a shot transmission method using the system according to the invention.

In order to better understand the invention, it is useful to be familiar with the principle of a televised image. A television camera provides a series of televised images, each image being formed of two interlaced frames. A televised signal consists of a series of successively transmitted images, namely 25 or 30 per second. This number of images depends for practical reasons upon the frequency of the voltage of the supply network used. Since in Europe the network frequency is 50 Hz, 50 frames are transmitted per second, namely 25 images per second (since the network frequency is 60 Hz in the United States, 60 frames are transmitted per second, namely 30 images per second).

As will be made more clear hereinbelow, the system and the method according to the invention allow a significant reduction in working costs to be obtained compared to present systems and they offer the possibility of using a markedly greater number of mobile cameras working with few frequencies. As a result of its great flexibility, this new system thus also allows the extent of use of wireless image transmission via an H.F. system to be enlarged.

Figure 1A:
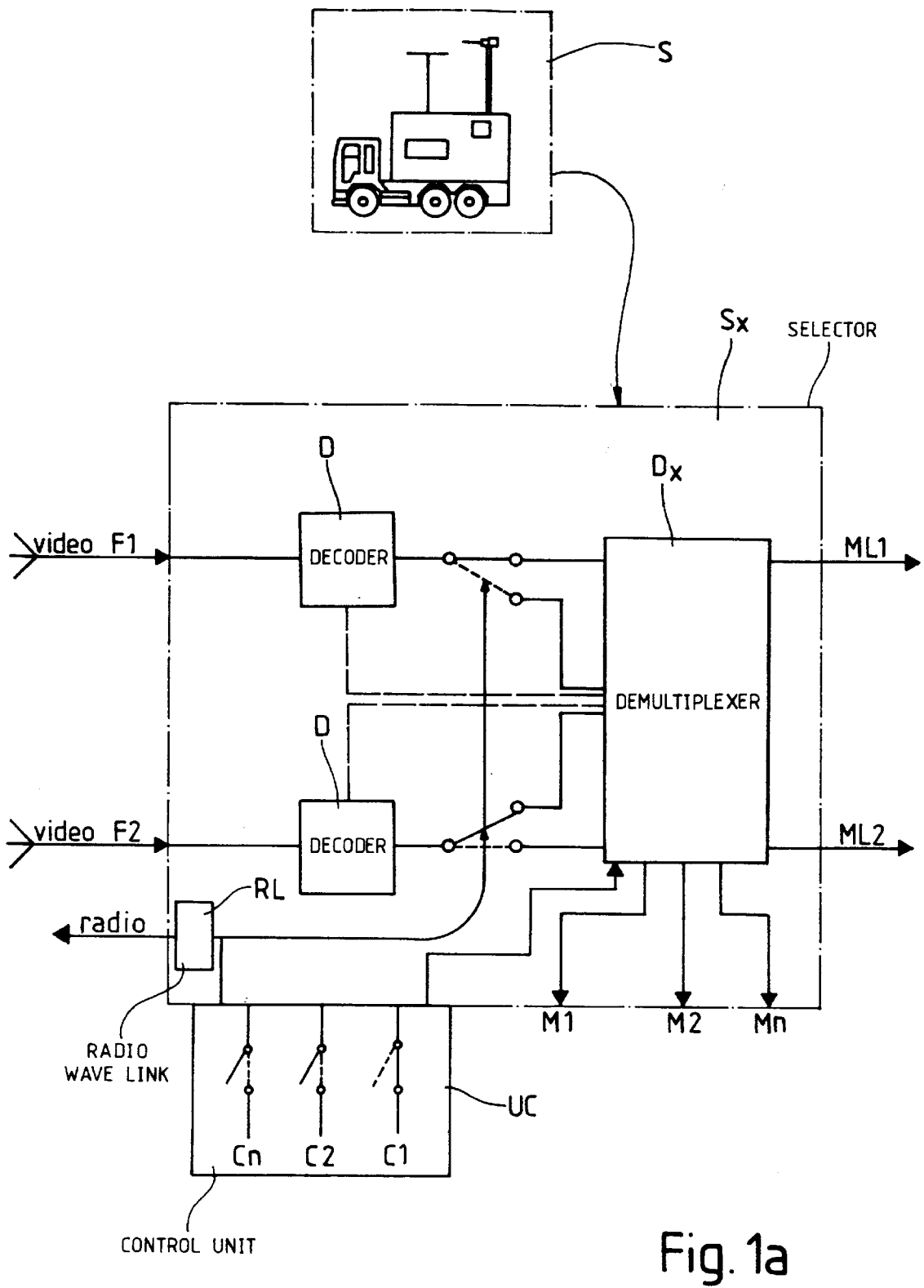

Several embodiments of the subject of the invention will be described hereinafter, solely by way of example, and with reference to the attached drawings, in which:

FIG. 1 shows schematically a system according to the invention with its principal components and their interconnections, FIG. 1a shows schematically in more detail the equipment to be installed in a central production unit, FIG. 1b shows schematically a channel selector in the central production unit of the system according to the invention, FIGS. 2a, b, c, d, and e show schematically several possible alternative video signals transmitted by the video channels linking the cameras to the central production unit of the system according to the invention, FIG. 2f shows schematically a control radio signal acting on the cameras of the system according to the invention, FIG. 3 shows schematically in more detail the signals transmitted by the cameras in the case corresponding to FIGS. 2a and 2b, and FIG. 4 shows an example of a practical configuration able to be achieved with the system according to the invention.

FIG. 1 shows schematically an H.F. television shot transmission system according to the invention with its principal components and their interconnections. This system comprises several shooting units $C_i$ (i=1,2, ... n), each comprising a camera and a module $MD_i$ comprising a radio receiver HFR and a high frequency transmitter HFE, associated with an antenna HFA, able to transmit via radio waves the shot signal provided by said camera. In the following text, these shooting units will simply be designated by the term "camera" to facilitate comprehension. Each camera $C_i$ can for example be mobile or remain fixed in a given place, or be transported by helicopter, and follows the progress of an event which one wishes to broadcast live and, or to record.

Each camera $C_i$ transmits its shots via its transmitter HFE, by means of radio waves, to a central production unit S, also called the production station or studio, which may for example be a mobile production unit or any other fixed or mobile installation, which is capable of communicating via an antenna A with a terrestrial broadcasting network directly or via a satellite and/or of recording. In an advantageous manner, the cameras may be used for transmissions requiring image quality compatible with broadcasting on large public or private television networks.

Thus, the example shows a first fixed camera $C_1$. Of course, each camera may also be fitted with an integral video recorder; such a camera known for example by the name of "Camcorder" is referenced $C_2$ in FIG. 1. A third camera comprising its transmitter and connected to a video recorder MS, is referenced $C_n$ in FIG. 1.

Each module $MD_i$ thus includes amongst others a radio wave transmitter HFE and an antenna HFA for radiating the radio waves, comprising amongst others the video signal data.

Transmitter HFE transmits several signals on a channel made available by the granting authority, for example a channel of 6 to 8 MHz centered on a frequency of 2.3 GHz for example. These signals may be a video signal, one or more audio signals intended to provide a mono or stereo sound for example an ambient noise, a conversation, etc., and other types of signals such as for example those necessary for digital transmission of data.

Each module $MD_i$ also comprises a control box BC associated with a radio receiver, called control radio signal receiver HFR, for adapting the operation of the camera and any accessories to the requirements of the H.F. system according to the invention. This control box BC receives control signals, referenced radio in FIG. 1, transmitted by central control station or production station S and intended to control the operation of module $MD_i$ and the turning on or off of transmitter HFE and if necessary the functions of the camera itself and any accessories. Moreover, this control radio signal gives instructions to control box BC for controlling the frequency, the power and the video signal transmission mode via transmitter HFE. The operation of this control box BC will be explained in more detail hereinafter.

The video signal transmitted by transmitter HFE of each camera $C_i$ may further include a camera identification signal. This identification signal may be added to the video signal in a known manner, for example in the manner used for adding teletext codes to a television signal. It concerns a technique known to the man skilled in the art and it will thus not be explained here in detail.

Production station S receives the video signals from cameras $C_i$. For each frequency used by the system according to the invention, production station S comprises a receiver which is integrated in a video signal decoder D (see FIG. 1a). Station S further comprises a control unit UC for controlling the operation of the system. Control unit UC is used by the producer amongst other things for selecting the camera whose images will be used for the live broadcast and/or recording. For this purpose, control unit UC generates a control radio signal, so as to inform each camera of the desired operating mode at a given moment. For this purpose, control unit UC is associated with means RL for establishing a radio wave link, referenced radio in FIG. 1.

Of course, control unit UC may be pre-programd, for example by means of a computer, and controls and monitors via means RL control box BC (see FIG. 1) of cameras $C_i$ in accordance with the desired operation of the system.

The system is configured so that in the absence of a control signal, transmitters HFE are automatically switched off or set on standby. When necessary, control unit UC restarts or confirms operating mode and controls each transmitter by means of the control signal.

Thus, the producer can choose the "live" camera by selecting this camera on a keyboard associated with control unit UC. This choice generates a command transmitted via link RL to all the cameras of the system.

In an advantageous manner, a synchronisation command can be transmitted by link RL to the cameras enabling them to synchronise their output signal with the output signals of the other cameras. Moreover, each camera is equipped with a closed loop control unit allowing it to synchronise its output signal with the control radio signal transmitted by station S, and this each time that the system sends a control signal to the various cameras. This closed loop control unit may be incorporated in control signal receiver HFR.

In the embodiment of the invention given by way of example (see FIG. 1), the system uses two video signals associated with two different frequencies F1 and F2, respectively called the live frequency and the control frequency. Control frequency is used to mean a frequency used for the transmission of the shot signals from the cameras which are not "live". Of course, if there are more than two frequencies allotted by the granting authority, one or more frequencies may be used for the live and/or control frequency.

In the example, the two frequencies transmit amongst others the images from n antennas HFA which are linked to the cameras, to production station S. The signals arrive at station S in a selector $S_x$. Selector $S_x$ further comprises decoders D which distinguish between the video signals, the audio signals and/or the identification codes. The first video signal, associated with frequency F1, may be the signal received from camera $C_i$ which will be broadcast live and/or recorded while the other video signal, associated with frequency F2, is formed by the images from the other cameras $C_j$ which are combined by multiplexing. In other words, the video signals formed by the images coming from the other cameras $C_j$ are transmitted successively on frequency channel F2, for example in the manner described in document EP-B-O 0188 286 cited hereinabove. For this purpose, the cameras each comprise a switch, designated S1 in FIG. 1, which is controlled by the control signal transmitted by the radio link. In the configuration shown by way of example in FIG. 1, it is camera $C_1$ which transmits on frequency F1, while the other cameras $C_2$ to $C_n$ transmit in successive images spread over time, on frequency F2.

Selector $S_x$ of station S further comprises a demultiplexer $D_x$ which can select the video signals received in station S with a view to their desired routing.

When the video signals arrive at production station S, demultiplexer $D_x$ selects and routes each video signal to a monitor M1, M2, . . . Mn which allows the images taken by the corresponding camera to be seen. Each camera $C_i$ thus has a monitor $M_i$ for displaying its video signal. Thus the producer can follow all the shots and choose that which will be broadcast live and/or recorded. He may then make his selection on the basis of a global vision of events. Control unit UC thus functions as the interface between the producer and the system according to the invention.

In an advantageous manner, two additional monitors ML1, ML2 intended to display directly the signals transmitted on frequencies F1 and F2, are connected to the output of demultiplexer $D_x$. These monitors are thus directly assigned to the available frequencies. Of course, the frequencies used for transmitting the live signal and the control signal are interchangeable, since control unit UC can control the position of switches S1 via link RL.

In the example described, the live signal is provided by camera $C_1$. This signal is transmitted on frequency F1 and is thus directly displayed by monitor ML1. This signal is also routed to monitor $M_i$ assigned to camera $C_i$ (here therefore $M_1$ for $C_1$). The second signal which arrives at production station S, and which includes the multiplexed signal, is transmitted on frequency F2. This signal is then demultiplexed in order to route each image $I_j$ coming from each camera $C_j$ to monitor $M_j$ which is assigned thereto.

An electronic circuit CE (see FIG. 1b) is provided which is connected between the output of selector $S_x$ and each monitor $M_j$. Electronic circuit CE introduces received image $I_j$ into an image register $SS_j$ enabling image $I_j$ to be stored.

In the event that there are n number of cameras, the images coming from (n−1) cameras are incorporated into the multiplexed signal. The image from each camera will thus be rewritten, according to European standards, every ((n−1)/25) seconds. This displayed image thus changes each time that it is rewritten (or refreshed).

It is understood that the number of cameras able to be used with the system according to the invention is limited solely by the maximum refreshing time considered acceptable by the producer.

The operation of the system according to the invention will now be explained through the examination of different possibilities for transmitting the images shown in FIGS. 2a to 2e.

These figures show schematically several possible alternative video signals transmitted by the video channels on two available frequencies with the system according to the invention, namely a live frequency and a control frequency, such channels linking in these examples six cameras C1 to C6 to production station S. The example conforms to European standards comprising 25 images per second.

In FIG. 2a it is seen that during a first unit of time (for example a second), the producer has selected camera C1 as "live" camera on frequency F1. The other cameras thus receive from control unit UC an image transmission control signal according to a time sharing, the transmission being made on frequency F2, called the control frequency. Thus, camera $C_1$ transmits live on frequency F1, whereas the five other cameras $C_2$ to $C_6$ each transmit one image every fifth of a second on frequency F2. During the first second the signal transmitted on frequency F2 is thus composed of the successive camera signals, as follows:

C2 C3 C4 C5 C6 C2 C3 C4 C5 C6 C2 C3 C4 C5 C6 C2 C3 C4 C5 C6 C2 C3 C4 C5 C6.

FIG. 3 shows for the example of FIG. 2a the activities of transmitters HFE of each camera.

Thus, the sequence of the multiplexed signals transmitted on frequency F2 is repeated five times per second, it being understood that there will first be a first image of a duration of ⅕th of a second from camera C2, followed by a first image from camera C3 of the same duration, and so on until the image from camera C6. Then, the same sequence of a duration of ⅖ths of a second is repeated.

In the example considered, after a certain period of time, here one second, the producer selects another camera, camera C2, as the next "live" camera. This camera continues, in this example, to transmit on frequency F2, but now live. Consequently, only switches S1 assigned to control the transmission frequency of cameras $C_1$ and $C_2$ do not change position. The multiplexed video signal transmitted on frequency F1 comprises signals from the cameras according to the following cycle:

C1 C3 C4 C5 C6 C1 C3 C4 C5 C6 C1 C3 C4 C5 C6 C1 C3 C4 C5 C6 C1 C3 C4 C5 C6.

Another second later, the producer prefers the shot coming from camera C3. The images transmitted by this camera C3 continue in an advantageous manner to he transmitted on frequency F1. Frequency F2, which then becomes the control frequency, is thus used to transmit the following cyclic series:

C1 C2 C4 C5 C6 C1 C2 C4 C5 C6 C1 C2 C4 C5 C6 etc . . .

However, it is possible that the producer prefers to keep the channel transmitting the images from the "live" camera on the same television carrier frequency, since he is then sure that this frequency functions properly. On monitor ML1 showing the live signal, the producer can see if the quality of the transmission made on frequency F1 is good, while the quality of the transmission made on the other frequency F2 is more difficult to judge. In such case, only switches $S_1$ assigned to select the frequency of cameras $C_1$ and $C_2$ (FIG. 1) change position. FIG. 2b shows this alternative. In this case, the same cameras as in the alternative of FIG. 2a have been selected, the cameras transmitting the same signals (see also FIG. 3) and doing so in the same order as in FIG. 2a. However, frequency F1 is still used for the transmission of the signal from the "live" camera. Consequently, in this case, frequency F2 remains the control frequency and is used to transmit the images spread out over time from the other cameras.

If the transmission to be followed is more static, the producer can choose a greater refreshment time between each camera than in the case of FIGS. 2a and 2b. FIG. 2c shows this alternative. This example is similar to that of FIG. 2a except as regards the refreshing and multiplexed image transmission time. The video signal transmitted on control frequency F2 is then composed of the following cycle:

C2 C2 C2 C2 C2 C3 C3 C3 C3 C3 C4 C4 C4 C4 C4 C5 C5 C5 C5 C5 C6 C6 C6 C6 C6, i.e. each camera transmits in a cyclic manner five successive images.

It is thus understood that the camera transmitters may transmit during a variable period of time controlled by the control radio signal.

Consequently, the refreshment time may thus be different for the various cameras. This may be useful for example for the making of a television program covering a downhill ski race. The cameras may then be for example six in number and installed all the way along the downhill run, camera C1 being placed at the starting point and camera $C_6$ being situated at the finish. When the first participant begins his descent, the shot from camera $C_1$ is the most interesting and it will thus be transmitted live. The shots from cameras $C_2$ and $C_3$ are the most interesting from the point of view of monitoring, since the skier will then pass the places where they are installed. These cameras are thus to be preferred. Whereas the other cameras $C_4$, $C_5$ and $C_6$ are not yet very interesting. FIG. 2d shows, for this example, the representation of the images transmitted on frequencies F1 and F2. The sequence of cameras transmitting on control frequency F2 will thus be as follows:

C2 C3 C4 C2 C3 C5 C2 C3 C6 C2 C3 C4 C2 C3 C5 C2 C3 C6, etc.

During the descent, the shot from the second camera becomes more interesting. The producer thus chooses this camera $C_2$ as the "live" camera. Moreover, he chooses cameras $C_3$ and C4 as cameras to be preferred. The new sequence of cameras transmitting on control frequency F2 will thus be as follows:

C3 C4 C5 C3 C4 C6 C3 C4 C1 C3 C4 C5 C3 C4 C6 C3 C4 C1, etc.

FIG. 2e shows an example of a static event. It is su-ficient here to transmit the images from each camera on control frequency F2 only once per second. The image on monitor $M_i$ of each control camera $C_i$ is thus only refreshed once per second. Camera $C_j$ is here the "live" camera. The sequence of cameras producing the video signal transmitted on control frequency F2 is thus as follows:

C2 - - - C3 - - - C4 - - - C5 - - - C6, etc.

The producer then chooses camera C2 as the "live" camera, and the other cameras will thus transmit one image per second spread out in time on the control frequency.

It is thus understood that it is also possible to transmit all the images from the cameras on a single frequency, by periodically omitting an image coming from the "live" camera and replacing this image with an image coming from one of the other cameras.

As soon as a control signal is received and interpreted, it prepositions a logic circuit which will turn on the transmitter at the end of the present image. This command is executed in a synchronous manner and does not disturb the distribution of images transmitted on the control frequency.

The control signal may comprise an identification code, followed by a command for turning on transmitter HFE and possibly followed by one or more instructions and possible data. For example, if the system according to the invention comprises six cameras, one of them, for example camera $C_1$, will receive the command to transmit live on frequency F1, while the other cameras will periodically receive a control signal which causes them to transmit an image on control frequency F2.

The control signal generated by control unit UC and transmitted by link RL may be composed as follows:

($idC_i$ "turn on" "live" F1) ($idc_j$ "turn on" "image" F2)

with
$idC_i$ = camera $C_i$ identification code; (i = 1)
$idC_j$ = camera $C_j$ identification code; (j = 2, 3, 4, 5, 6);
"turn on" = transmission instruction;
"live" = live mode instruction;
"image" = control mode instruction;
F1, F2 = frequencies on which cameras $C_i$ and $C_j$ must transmit The succession of control signals corresponding to the preceding example may be composed as follows:

($idC_1$ "turn on" "live" F1) ($idC_2$ "turn on" "image" F2)
($idC_1$ "turn on" "live" F1) ($idC_3$ "turn on" "image" F2)
($idC_1$ "turn on" "live" F1) ($idC_4$ "turn on" "Image" F2)
($idC_1$ "turn on" "live" F1) ($idC_5$ "turn on" "image" F2)
($idC_1$ "turn on" "live" F1) ($idC_6$ "turn on" "image" F2)
($idC_1$ "turn on" . . . . etc . . .

The control signal is thus periodically transmitted to keep the transmitter or transmitters turned on. Thus, if for any reason, the link between production station S and one or more cameras of the system comes to be interrupted, the transmitter or transmitters of said cameras stop(s) transmitting. The cameras then wait for a new control signal. The duration of such control signal R transmitted by control unit UC depends on its content (see FIG. 2f). It is thus understood that the maximum duration of this signal depends on the standards used. Given that a televised image comprises X images per second, the maximum duration of such a control signal must thus in any event be less than 1/Xth of a second.

As a result of the continual validation of the operation of transmitter HFE of each camera of the system according to the invention, the use of the frequency spectrum is reduced to the bare essential. Indeed, when no control signal is received from control unit UC, each camera stops transmitting at the latest after the duration of the present image. Thus, via this automatic cutting out, unnecessary use, and thus pollution of the spectrum by interfering cameras is avoided. Consequently, if the camera leaves the control signal reception field, for example by entering a tunnel, and can no longer pick up this control signal, its transmitter HFE is also rapidly turned off to avoid thus polluting the frequency spectrum.

A specific camera operating control can also be provided in control unit UC, such as for example the "tally" (term frequently used to mean the signal lamp), the brilliancy of the image, the desired diaphragm etc. Since a control signal is transmitted with every image, a continual operating control is thus possible.

An example of a practical configuration able to be achieved with the system according to the invention will now be described with the aid of FIG. 4. The example concerns the making of a television program, with a view to the live broadcasting thereof, covering a sporting event involving participants following each other, the first participant being followed by a second etc., as is the case for example during a golf tournament or a downhill ski race.

Fifteen H.F. cameras $C_1$, $C_2$, ... $C_{15}$ are provided to follow the event and transmit their shots to a central production unit or production station S. It is desirable for all the cameras to be displayed in the central control room to enable the producer to have a global view of events. In the case of installations of the prior art, fifteen frequencies would have been required.

In the example of FIG. 4, camera C2 transmits live on frequency F1. If necessary, in the event that there are three frequencies F1, F2, F3 assigned by the granting authority, a second shot can be transmitted live, in the example that from camera $C_{15}$, on the second frequency F2, while the shots from the other cameras, here thus $C_1$, $C_3$ to $C_{14}$, are multiplexed and transmitted on control frequency F3. Thus, all the cameras may be displayed in the central control room.

We claim:

1. High frequency television image transmission system comprising:

at least three shooting units each comprising a camera and a module comprising a radio wave receiver and a high frequency transmitter (HFE) able to transmit via radio waves a shot signal provided by said camera to a central production unit capable of communicating with a television network for broadcasting live and/or recording at least one of said signals, two hertzian video channels allowing respectively the transmission on a first and a second predetermined carrier frequency of a video signal representing a determined number of images per second, said channels linking said shooting units to said central production unit, said central production unit comprising a control unit comprising means for establishing a radio wave link with said receivers of said shooting units, the system being characterized in that said linking means are arranged so that they can transmit a control radio signal to said shooting units for remote controlling the operation of said shooting units, their transmitters and their receivers and for controlling the assignment of said channels to said shooting units so that one of said channels transmits, on one of said carrier frequencies, a first video signal formed by the shot signal coming from a selected shooting unit, while the other of said channels transmits, on the other of said carrier frequencies, a second video signal formed by temporal multiplexing of the shot signals coming from the other shooting units, and in that said control unit transmits said control radio signal to said shooting units for each image so as to validate, image by image, the operation of said module ($Md_i$) and the turning on of said transmitter (HFE).

2. System according to claim 1, characterized in that each shooting unit further comprises a closed loop control unit enabling it to synchronize its output signal with the control unit radio signal transmitted by said central production unit.

3. System according to claim 1, characterized in that it further comprises means for selecting the carrier transmission frequency of the shot signal from each of said shooting units.

4. Shot transmission method implemented via a system according to claim 1 comprising the following steps:

establishing a radio signal link between a central production unit and said shooting units in order to select one of said shooting units to transmit, on one of said channels, a shot signal, and to instruct each of the other shooting units to transmit by temporal multiplexing on the other vide channel signal representing an image, validating image by image the module operation of the shooting units and the turning on of the transmitter able to transmit via radio waves a shot signal provided by a camera to a central production unit.

5. Shot transmission method according to claim 4, characterized in that it also comprises the following step:

transmitting on said other video channel a determined number of shot images, such number of images consisting of a number of images coming from one of said other shooting units, and being greater than the number of images coming from the other of said other shooting units.

6. Shot transmission method according to claim 4, characterized in that it comprises in addition the following step:

transmitting on said other video channel a determined number of shot images, such number of images consisting of a number of images coming from at least two of said other shooting units, and being greater than the number of images coming from the other of said other shooting units.

7. System according to claim 2, characterized in that it further comprises means for selecting the carrier transmission frequency of the shot signal from each of said shooting units.

8. Shot transmission method implemented via a system according to claim 2, comprising the following steps:

establishing a radio signal link between a central production unit and said shooting units in order to select one of said shooting units to transmit, on one of said channels, a shot signal, and to instruct each of the other shooting units to transmit by temporal multiplexing on the other vide channel signal representing an image, validating image by image the module operation of the shooting units and the turning on of the transmitter able to transmit via radio waves a shot signal provided by a camera to a central production unit.

9. Shot transmission method according to claim 3, characterized in that it also comprises the following step:

transmitting on said other video channel a determined number of shot images, such number of images consisting of a number of images coming from one of said other shooting units, and being greater than the number of images coming from the other of said other shooting units.

10. Shot transmission method according to claim 8, characterized in that it also comprises the following step:

transmitting on said other video channel a determined number of shot images, such number of images consisting of a number of images coming from one of said other shooting units, and being greater than the number of images coming from the other of said other shooting units.

11. Shot transmission method according to claim 9, characterized in that it comprises in addition the following step:

transmitting on said other video channel a determined number of shot images, such number of images consisting of a number of images coming from at least two of said other shooting units, and being greater than the number of images coming from the other of said other shooting units.

12. Shot transmission method according to claim 8, characterized in that it comprises in addition the following step:

transmitting on said other video channel a determined number of shot images, such number of images consisting of a number of images coming from at least two of said other shooting units, and being greater than the number of images coming from the other of said other shooting units.

13. Shot transmission method according to claim 9, characterized in that it comprises in addition the following step:

transmitting on said other video channel a determined number of shot images, such number of images consisting of a number of images coming from at least two of said other shooting units, and being greater than the number of images coming from the other of said other shooting units.

* * * * *